United States Patent

Lin

[11] Patent Number: 5,977,684
[45] Date of Patent: Nov. 2, 1999

[54] ROTATING MACHINE CONFIGURABLE AS TRUE DC GENERATOR OR MOTOR

[76] Inventor: Ted T. Lin, 12307 Crayside La., Saratoga, Calif. 95070

[21] Appl. No.: 09/096,766

[22] Filed: Jun. 12, 1998

[51] Int. Cl.[6] .............................. H02K 1/22; H02K 31/00
[52] U.S. Cl. ...................... 310/268; 310/178; 310/216; 310/179; 360/99.08; 360/99.04; 360/98.07; 322/48
[58] Field of Search .................................. 310/177, 178, 310/180, 181, 203, 207, 208, 216, 268, 102 R, 67 R; 360/99.08, 99.04, 98.07, 99.09, 99.11; 322/48

[56] References Cited

U.S. PATENT DOCUMENTS

| | | | |
|---|---|---|---|
| 4,217,508 | 8/1980 | Uzuka | 310/46 |
| 5,202,595 | 4/1993 | Sim et al. | 310/13 |
| 5,278,470 | 1/1994 | Neag | 310/178 |
| 5,334,898 | 8/1994 | Skybyk | 310/268 |
| 5,594,606 | 1/1997 | Hans et al. | 360/99.08 |
| 5,814,914 | 9/1998 | Caamano | 310/216 |
| 5,864,198 | 1/1999 | Prinkerton | 310/266 |

*Primary Examiner*—Thomas M. Dougherty
*Assistant Examiner*—Tran N Nguyen
*Attorney, Agent, or Firm*—Thomas Schneck; John P. McGuire, Jr.

[57] ABSTRACT

A rotating machine configurable as a pure DC generator for use in various applications, including recharging batteries in battery operated portable devices. The generator consists of a pair of permanent magnets which are mounted on two rotating magnetic ferrous metal hubs. The magnets are aligned so that they have the same polarity facing each other. The hubs, including the magnets, rotate around a stationary toroidal coil, which creates a magnetic flux. The flux from the two magnets cuts the conductor to the toroidal coil in a same direction upon rotation of the hubs, creating an emf (current) which is always in the same direction. Thus, a direct current is created, without the need for commutation or rectification. The input and output functions of the generator may be reversed to enable the generator to function as a DC motor.

17 Claims, 6 Drawing Sheets

ROTATING MACHINE CONFIGURABLE AS TRUE DC GENERATOR OR MOTOR

TECHNICAL FIELD

This invention relates generally to motors and to direct current producing machines. More specifically, this invention relates to a rotating machine configurable as a true DC generator and a motor.

BACKGROUND ART

A generator is an electrical machine that converts mechanical energy into electrical energy, producing either an alternating current or a direct current. There are two types of DC generators in present technology. One type of DC generator is a rotating magnet generator with a rectifier. The rotating magnet generator is generally known as an alternator that generates AC power and then is rectified into DC power. The other type of DC generator is a rotating coil generator that produces AC current and is used with a commutator to make the current unidirectional. In both types of generators, the induced current through the coil is alternating current. The relative motion of a rotating coil in a steady magnetic field or stationary coil in a rotating magnetic field will produce an induced electromotive force, also known as emf or voltage, and an associated current. Since, generally, the current produced is alternating, the rectifier or commutator is necessary to change the alternating current to direct current. However, there are many applications in which the traditional design of such DC generators is too large and inefficient. One of these applications is recharging batteries used in portable computers, cellular phones, automobiles, motorcycles or other devices, where it is required to recharge a battery efficiently.

A similar type of machine is an acyclic homopolar generator, which is a direct-current generator in which the poles presented to the armature are all of the same polarity, so that the voltage generated in active conductors has the same polarity at all times. Thus, a direct current is produced, without commutation. However, due to the single conductor design of most homopolar generators, it can only produce low voltages, so it is generally only useful in low voltage applications.

U.S. Pat. No. 5,278,470 to Neag discloses a homopolar machine for producing high voltage, direct current. The machine is comprised of a stator which supports the homopolar machine, a plurality of excitation coils disposed within the stator for producing magnetic flux so that the homopolar machines can produce direct current when in operation, a rotor rotationally disposed within the excitation coils for rotating through the magnetic flux when the homopolar machine is in operation to produce direct current, and a coil of a single length continuous conductor element disposed about the rotor such that a plurality of rotor conductor segments are formed wherein successive ones of the plurality of conductor segments are electrically connected such that an induced voltage and direct current are produced in the coil when the rotor and coil traverse through the magnetic flux during homopolar machine operation.

It is an object of the present invention to provide a generator that generates true DC power in the coil without the need for commutation or rectification. It is another object to provide a generator that is efficient and does not incur the usual eddy current or hysteresis losses which occur in almost all rotating machines. It is still another object of the present invention to provide a generator that is useful for recharging batteries and a motor which may be driven by such batteries.

SUMMARY OF THE INVENTION

The above objectives have been met by providing a rotating machine which, in one configuration, operates as a true DC generator in which a pair of permanent magnets are mounted on two rotating ferrous metal hubs and are aligned so that the magnets have the same magnetic polarity facing each other. A stationary toroidal coil of rectangular cross section is positioned between the two rotating hubs. Additional magnetic material toroids are attached outside of the stationary coil to help conduct the magnetic flux. As the ferrous hubs, including the magnets, rotate around the coil, a magnetic flux is created and the two sections of the conductors of the coil cut the magnetic flux in the same direction. Since the conductors are passing through a steady magnetic flux, rather than an alternating or a rotating flux, there is no current generated in the other two sections of the conductors. Since the induced emf (and current) through the magnetic field is always in the same direction, there are no eddy current or hysteresis losses in this type of device. Thus, the generator of the present invention produces pure DC power and can be made of a size that is useful in recharging batteries for battery operated portable devices. The generator of the present invention can also be used as a motor by reversing the input and output functions, without any additional modification.

BEST MODE FOR CARRYING OUT THE INVENTION

Figure 1:
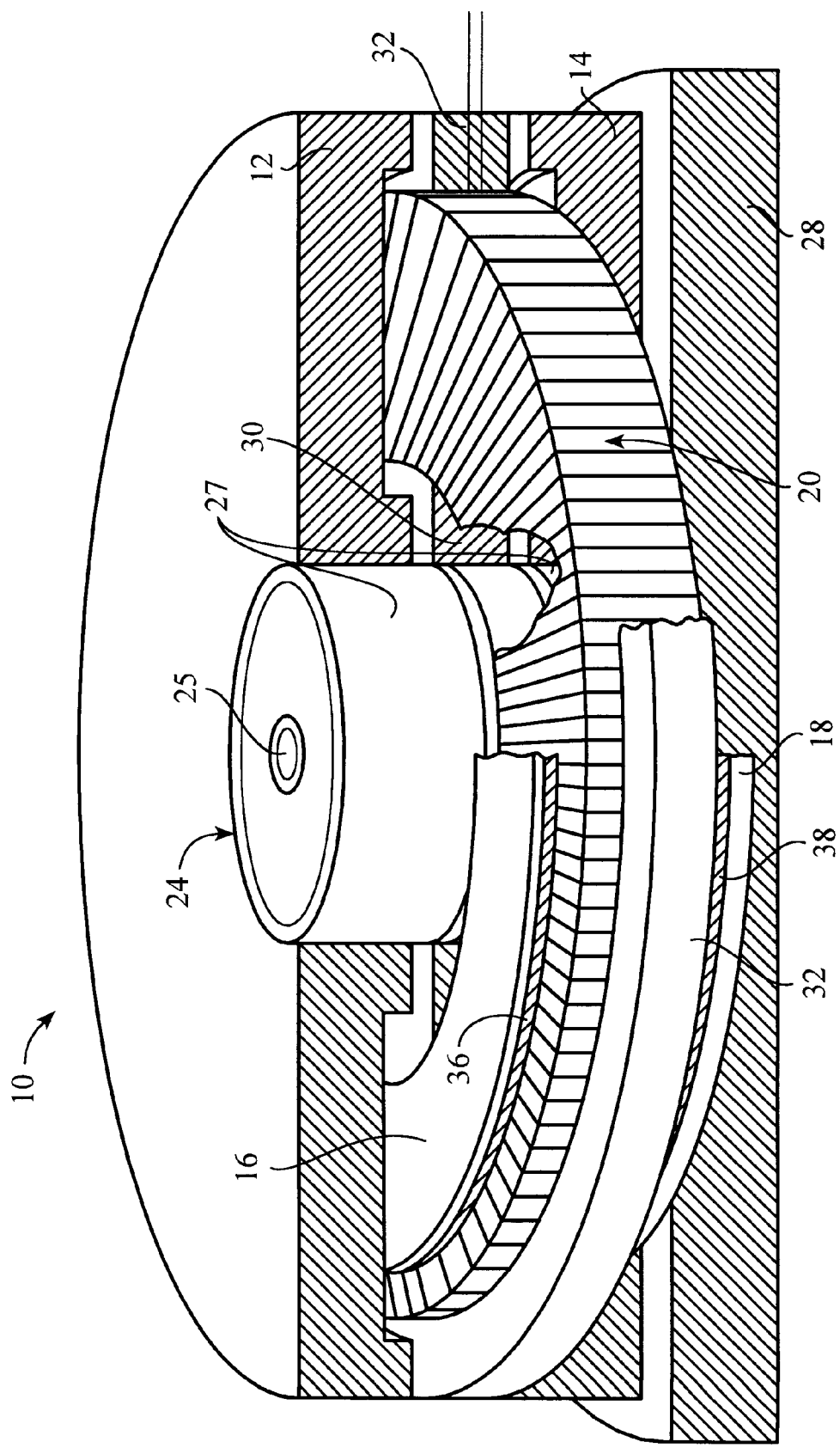
FIG. 1 is a perspective view of a first embodiment of the DC generator provided in accordance with the present invention.

Referring to FIG. 1, the DC generator 10 of the present invention includes two rotating magnetic ferrous metal hubs, an upper hub 12 and a lower hub 14, which are connected to a support assembly 24. The support assembly 24 consists of a shaft 25, and bearings 27 mounted to spin about shaft 25. The magnetic material hubs 12 and 14 together as a pair are energized by an external drive mechanism. The hubs 12 and 14 together substantially enclose the entire DC generator 10 on the outer perimeter. A stationary coil 20, is disposed within the hubs 12 and 14, and is described in more detail with reference to FIGS. 6 and 7. A pair of spaced-apart, annular permanent magnets 16 and 18 are mounted on the inside of the rotating hubs 12 and 14.

In FIG. 1, the upper annular magnet 16 is shown to be attached to the upper rotating hub 12 and the lower annular magnet 18 is shown to be attached to the lower rotating hub 14. The magnets can equivalently be disk magnets, as well as annular magnets and are typically about 0.05 inches thick.

The thickness of the magnets should be chosen to be thick enough so that enough energy is produced for operation of the generator, but thin enough to keep the overall size of the generator compact and to avoid waste of magnet material. The preferred materials of each magnet are Neodymium Iron and Boron (Nd—Fe—B) or Samarium Cobalt (SmCo), which are commonly used materials in the industry. The magnets 16 and 18 are aligned such that the same magnetic polarity is facing each other. On top of the magnets 16 and 18, are mounted two magnetic material toroids 36 and 38. As shown, upper toroid 36 is mounted on magnet 16 and lower toroid 38 is mounted on magnet 18. Each toroid has a rectangular cross section and helps to conduct the magnetic flux. Two additional magnetic material toroids are mounted around the stationary coil 20 in order to support the coil. The inner toroid 30 is mounted along the inner diameter of the stationary coil 20, the outer toroid 32 is mounted around the outer diameter of the stationary coil 20. The inner toroid 30 and outer toroid 32 help to prevent reverse current generated from the coil 20, and help to conduct the magnetic flux. The magnetic material used for the toroids 30, 32, 36 and 38 should be of a type having a high permeability, such that the amount of magnetic induction produced in the material is high. Base 28 is provided to give the DC generator 10 support for mounting.

Figure 2:
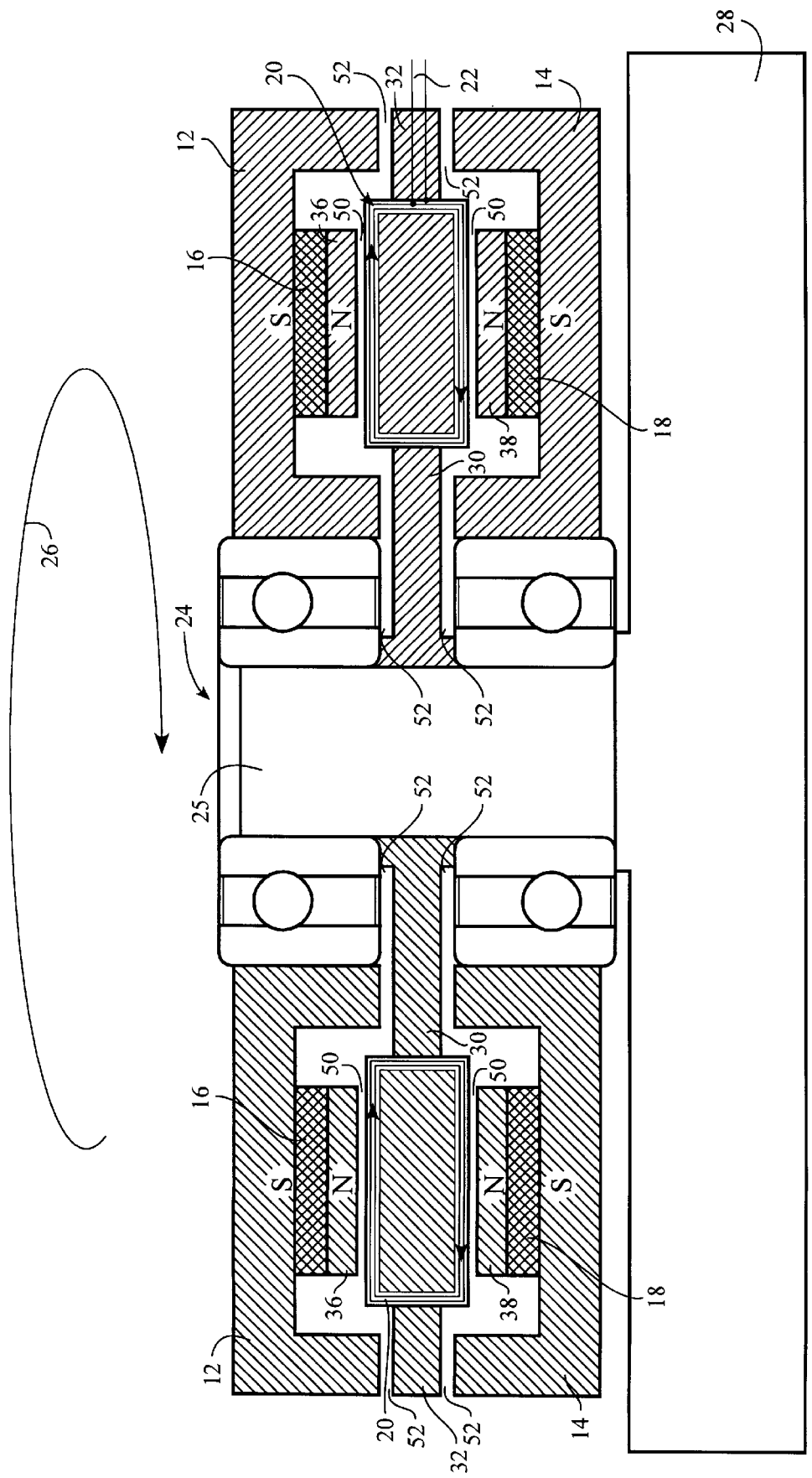
FIG. 2 is a cross-sectional view of the first embodiment of the present invention.

As shown in FIG. 2, the support assembly 24 supports the two rotating hubs 12 and 14. The permanent magnets 16 and 18 are mounted on the rotating hubs, with the magnetic material toroids 36 and 38 attached to the magnets 16 and 18. There are air gaps 50 between each of the toroids 36 and 38 and the stationary coil 20. There are additional air gaps 52 between the inner toroid 30 and upper hub 12, between the inner toroid 30 and the lower hub 14, between the outer toroid 32 and the upper hub 12, and between the outer toroid 32 and the lower hub 14. The size of the air gaps 50 and 52 is approximately 0.01–0.02 inches. Optionally, ball bearings may be placed in each of the additional air gaps 52, to assist in the rotation of the hubs 12 and 14.

Figure 3:
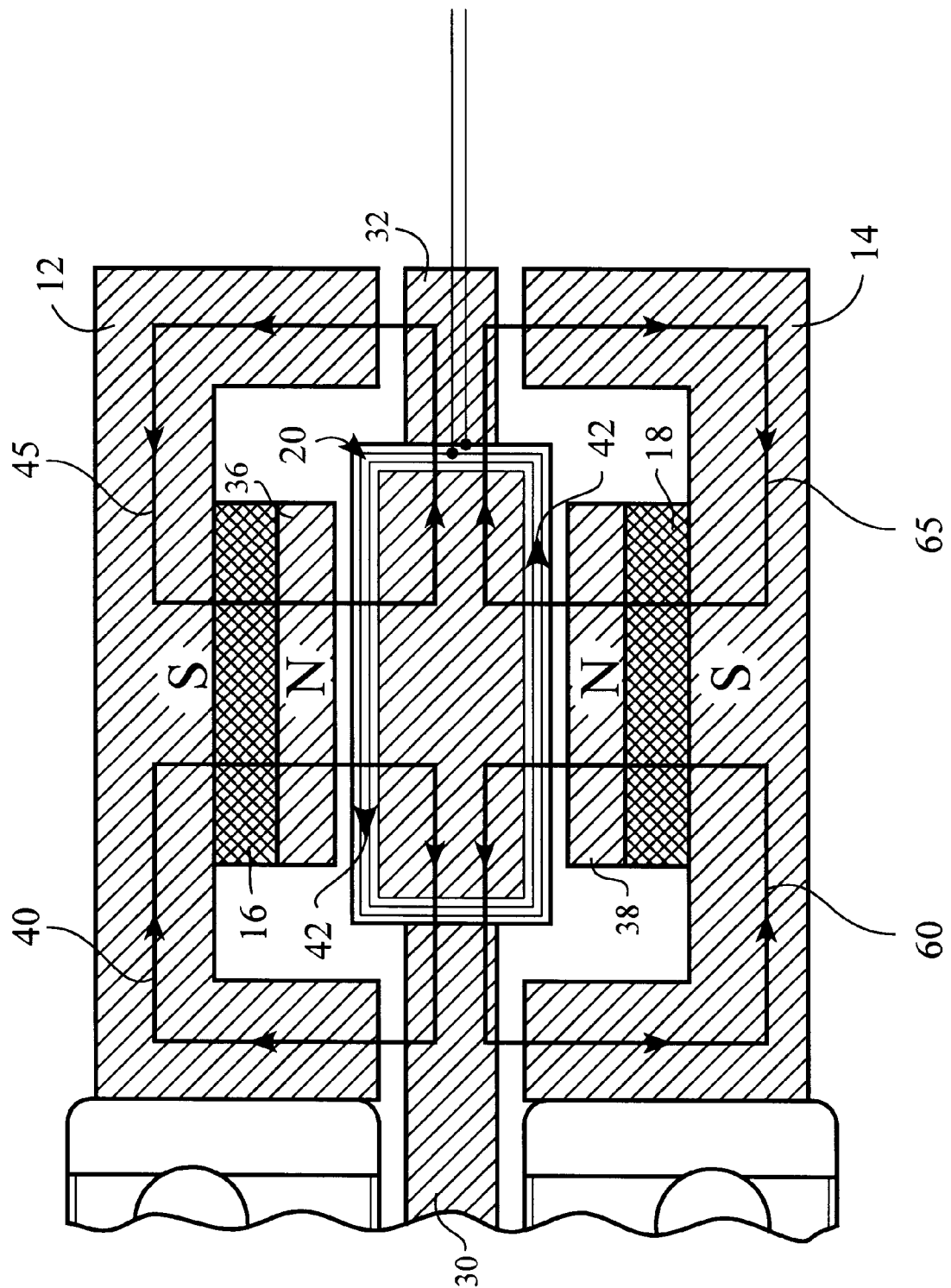
FIG. 3 is a detailed cross-sectional view of a section of the first embodiment of the present invention.

How the DC generator produces the pure DC power is shown with reference to FIGS. 2 and 3. In operation, the rotating hubs 12 and 14 rotate around the stationary coil 20. In FIG. 2, the direction of rotation 26 is shown to be clockwise. As the magnets 16 and 18 rotate around the stationary coil 20, a magnetic flux is created and the two sections of conductors of the coil cut the magnetic flux in the same direction. This creates an induced emf and a corresponding current in the conductors. The current is transported from the coil 20 to outside of the DC generator 10 through a wire 22. The wire 22 can be routed through the outer toroid 32, as shown in FIG. 2, or it can be routed through the inner toroid 30 and then through a hollow opening in the shaft 25 of the support assembly 24.

In FIG. 3, the flux paths 40, 45, 60, 65 are shown. As the hubs 12 and 14 rotate in the clockwise direction specified in FIG. 2, a magnetic flux is created and the flux paths 40, 45, 60, 65 conduct through the highly permeable magnetic material toroids 30, 32, 36, 38. When the flux paths 40, 45, 60, 65 cut the conductors of the stationary coil 20, a current 42 is induced in the coil 20 of the generator. Since the magnets 16 and 18 have polarities facing each other, as shown by the north poles of each magnet being aligned to face the stationary coil 20, it can be seen that flux paths 40 and 45 cut the stationary coil 20 in the same direction and that flux paths 60 and 65 also cut the stationary coil 20 in the same direction. Since the magnetic flux is steady, and not rotating, there is no current generated in the other two sections of the conductors. The induced current 42 through the magnetic field is always in the same direction and is not alternating. Therefore, the current produced is pure DC and there is no need for commutation or rectification in order to obtain the DC current. Additionally, because the induced current is always in the same direction, there are none of the eddy current or hysteresis losses that are found in devices that have time-varying fluxes.

Figure 4:
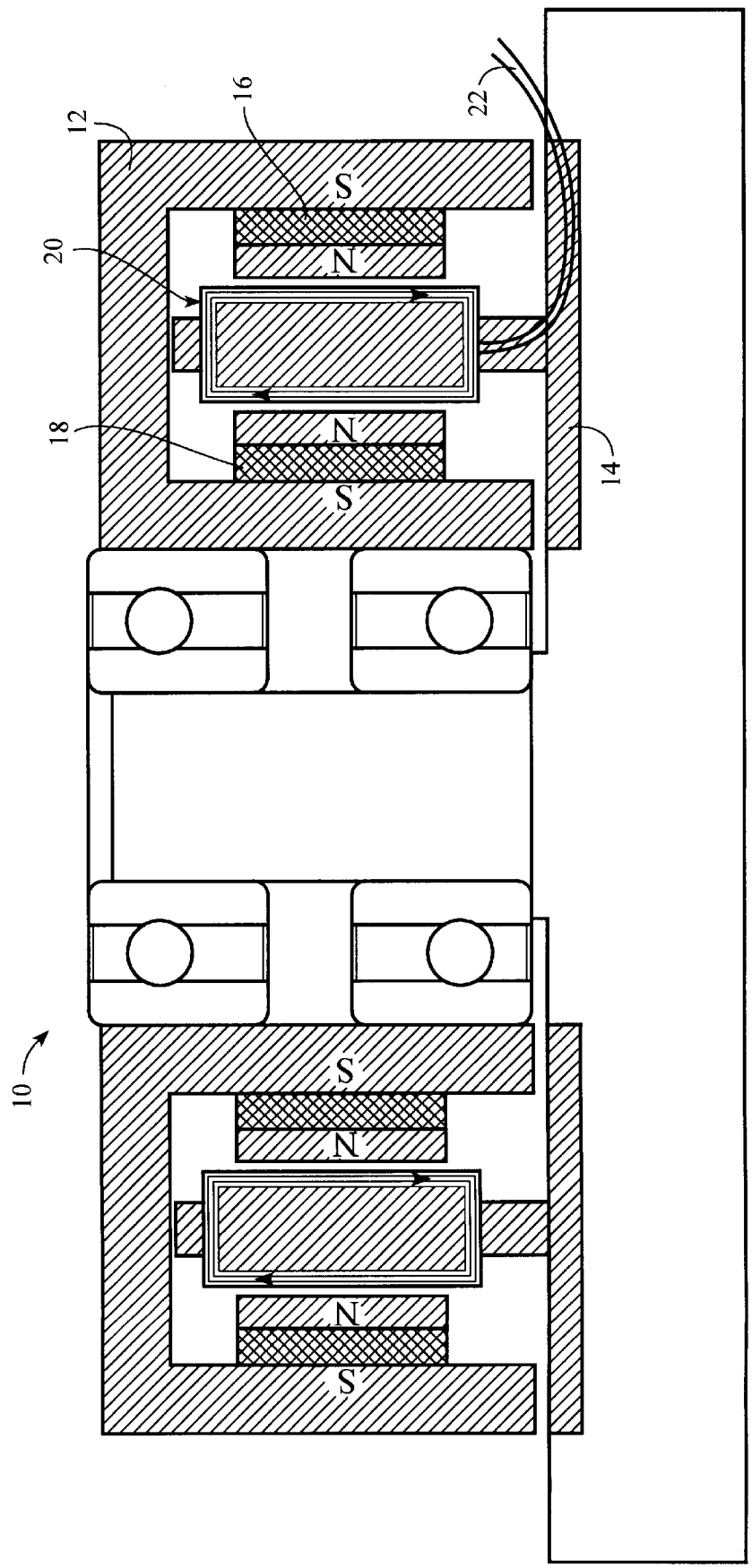
FIG. 4 is a cross-sectional view of a second embodiment of the DC generator of the present invention.

Additional embodiments of this invention can be constructed, such as the DC generator 10 shown in FIG. 4. In FIG. 4, the upper rotating hub 12 is shaped in an inverted U-shape and extends for the height of the generator. The magnets 16 and 18 are mounted vertically on the side walls of the hub 12. The magnets are aligned such that the same polarities face the coil 20, and the manner in which the DC generator operates is the same as described for the device shown in FIGS. 2 and 3. In this embodiment, the wire 22 is routed through the lower rotating hub 14.

Figure 5:
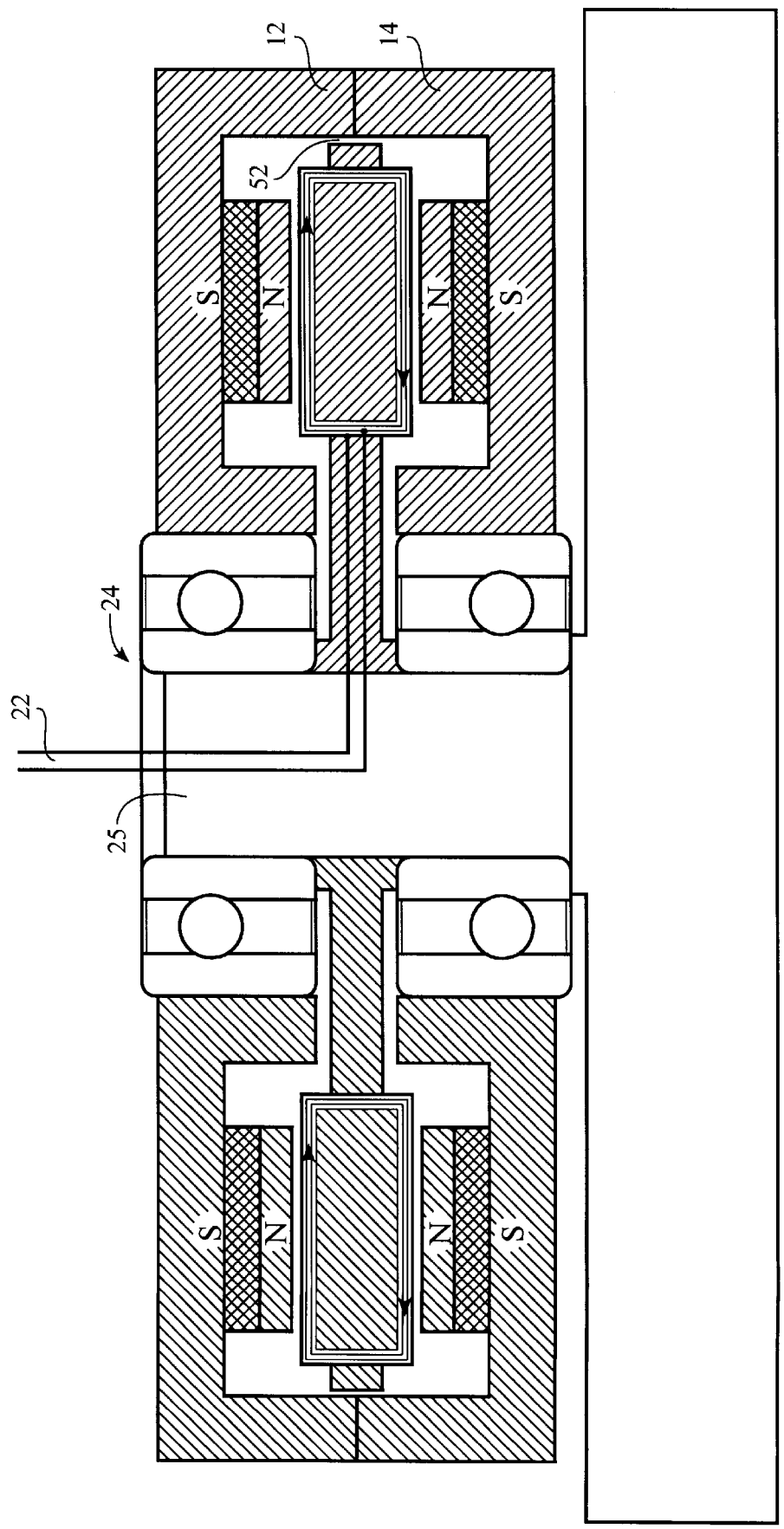
FIG. 5 is a cross-sectional view of a third, and the preferred, embodiment of the DC generator of the present invention.

In FIG. 5, another embodiment of the invention is shown. The embodiment shown in FIG. 5 is the preferred embodiment of the invention, and is very similar to the embodiment shown in FIG. 2. In this embodiment, the two rotating hubs 12 and 14 completely touch together on the outer edge. This creates a radial air gap 52 between the outer toroid 32 and the rotating hubs 12 and 14. The current generated is transported from the coil through wire 22, which is routed through the inner toroid 30 and out through a hollow opening in the shaft 25 of the support assembly 24.

Figure 7:
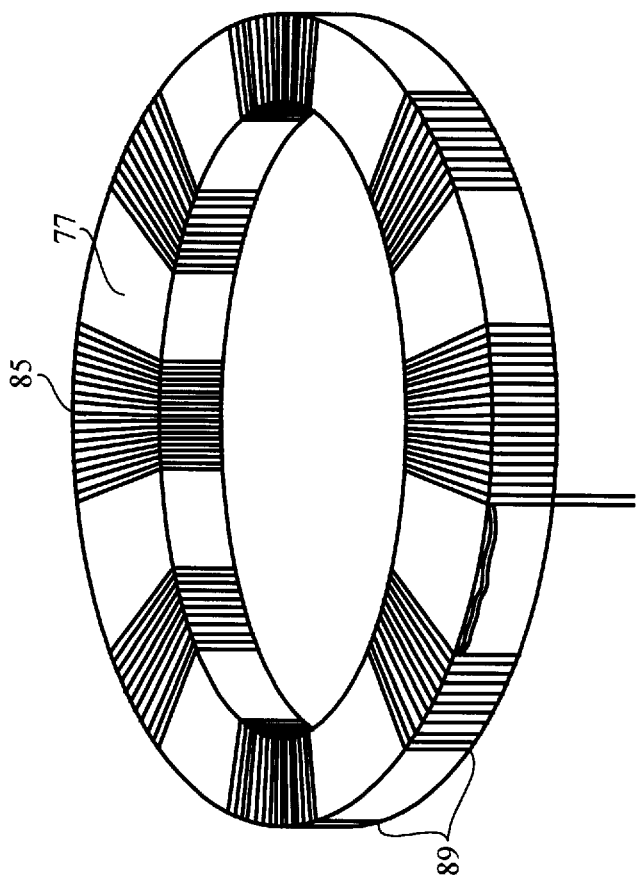
FIG. 7 is a perspective view of an alternative construction of the stationary coil used in the present invention.
Figure 6:
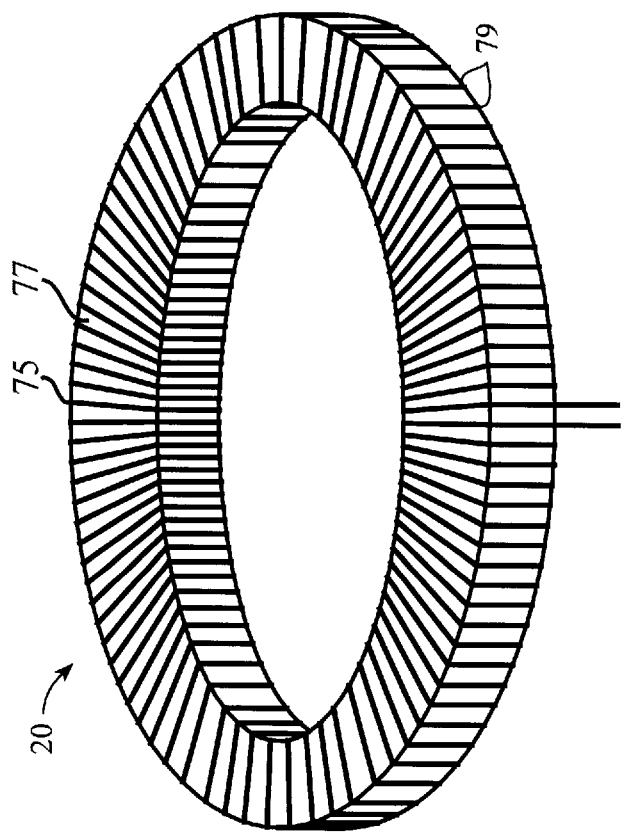
FIG. 6 is a perspective view of the construction of the stationary coil used in the present invention.

FIGS. 6 and 7 show alternate constructions for the coil assembly 20. In FIG. 6, the copper magnet wire 75 is wound around the magnetic material toroidal core 77 such that there is a gap 79 of a uniform size between each turn of the winding. Normally, the size of the gap 79 is 3–5 times the wire size. It is preferred that the magnetic material used for the core 77 be the same as the material used for the toroids 30, 32, 36, 38, but it is not necessary that it be the same material. In an alternate construction, as shown in FIG. 7, the wire 85 can be wound around the core 77 in eight groups of coils adjacent to each other with equal spacing 89 between each group. Normally, in this version, the total winding area is equal to the total spacing.

The power produced by this pure DC generator is a true DC power. The voltage that can be produced by the generator is proportional to the speed of rotation of the generator, the magnetic flux density and the number of conductors through the magnetic field. A low rotating speed will produce a lower voltage while a high rotating speed will produce a higher voltage. The amount of current produced is dependent on the induced voltage, coil resistance, and load resistance, and the current will be a true DC current without need for rectification or commutation. As stated, the DC generator of the present invention can be useful in applications involving recharging batteries for portable computers, cellular phones, automobiles, or other portable battery operated devices. The DC generator of the present invention can also be configured as a DC motor by merely reversing the input and output by applying DC power to the output wire and designating the output to be the resulting rotational power in the pair of hubs 12 and 14. The motor application can be used for any devices that require rotating power.

An additional advantage is that the generator of the present invention can be made to be smaller and more compact than standard DC generators. A typical overall size of the DC generator of the present invention would be 0.75 inches in height with a two inch diameter or 1.25 inches in height with a one inch diameter. In this way, the DC generator is convenient to use and requires very little space for installation.

I claim:

1. A rotating machine operable as a DC generator or motor comprising:

a support assembly, including a shaft and a pair of bearings;

a pair of rotating ferrous metal hubs mounted to the outside of the support assembly;

a stationary coil consisting of a single length continuous conductor element wrapped repeatedly around a toroidal ferrous magnetic core having a rectangular cross section, the coil being disposed around the support assembly and inside of the rotating hubs;

a pair of magnets, each magnet being mounted on an inside surface of one of the rotating hubs and being aligned such that a first of the pair of magnets faces a side of the coil and a second of the pair of magnets faces an opposite side of the coil, each of the pair of magnets having a same magnetic polarity facing the coil such that magnetic flux from each magnet cuts the conductor element of the coil in a same direction when the hubs rotate;

a first ferrous metal toroid attached to the first magnet and positioned between the first magnet and the coil, a second ferrous metal toroid attached to the second magnet and positioned between the second magnet and the coil, an inner ferrous metal toroid attached to an inner circumference of the coil, an outer ferrous metal toroid attached to an outer circumference of the coil; and means for carrying the direct current from or to the conductor element of the coil.

2. A machine, as in claim 1, wherein the first magnet is mounted horizontally facing a top side of the coil and the second magnet is mounted horizontally facing a bottom side of the coil, and further including axial air gaps disposed between the rotating hubs and the inner and outer toroids.

3. A machine, as in claim 1, wherein the first magnet and second magnet are mounted vertically on opposite sides of one of the hubs and face opposite sides of the coil.

4. A machine, as in claim 1, wherein the rotating hubs contact each other on an outer edge, creating a radial air gap between the outer toroid and the rotating hubs.

5. A machine, as in claim 1, wherein the means for carrying direct current serves as a direct current input to enable operation as a DC motor.

6. A machine, as in claim 1, wherein the means for carrying direct current serves as a direct current output to enable operation as a DC generator.

7. A rotating machine running as a DC generator or motor comprising:

a support assembly;

a stationary coil disposed around the support assembly and consisting of a single length continuous conductor element wrapped repeatedly around a toroidal ferromagnetic core, a pair of rotating hubs mounted on the support assembly and disposed around the stationary coil;

a pair of magnets, each magnet being mounted on an inside surface of one of the rotating hubs and being aligned such that a first of the pair of magnets faces a side of the coil and a second of the pair of magnets faces an opposite side of the coil, each of the pair of magnets having a same magnetic polarity facing the coil such that magnetic flux from each magnet cuts through the conductor element of the coil in a same direction when the hubs rotate;

a first toroid attached to the first magnet and disposed between the first magnet and the coil, and a second toroid attached to the second magnet and disposed between the second magnet and the coil; and means for carrying the direct current from or to the conductor element.

8. A machine, as in claim 7, further comprising an inner toroid attached to an inner circumference of the coil and an outer toroid attached to an outer circumference of the coil.

9. A machine, as in claim 8, wherein the first magnet is mounted horizontally facing a top side of the coil and the second magnet is mounted horizontally facing a bottom side of the coil.

10. A machine, as in claim 9, further including axial air gaps disposed between the rotating hubs and the inner and outer toroids.

11. A machine, as in claim 10, wherein a plurality of ball bearings are disposed in the air gaps to assist rotation of the hubs.

12. A machine, as in claim 8, wherein the first magnet and second magnet are mounted vertically on opposite sides of one of the hubs and face opposite sides of the coil.

13. A machine, as in claim 8, further including a radial air gap disposed between the rotating hubs.

14. A machine, as in claim 8, wherein the rotating hubs contact each other on an outer edge, creating a radial air gap between the outer toroid and the rotating hubs.

15. A machine, as in claim 8, wherein the means for carrying the direct current include a wire routed through the support assembly.

16. A machine, as in claim 7, wherein the means for carrying direct current serves as a direct current input to enable operation as a DC motor.

17. A machine, as in claim 7, wherein the means for carrying direct current serves as a direct current output to enable operation as a DC generator.

* * * * *